United States Patent
Schoening

(10) Patent No.: US 9,095,957 B2
(45) Date of Patent: Aug. 4, 2015

(54) ROTARY ACTUATED AXIAL CLAMP

(71) Applicant: RIMROCK AUTOMATION, INC., Fort Collins, CO (US)

(72) Inventor: John Schoening, Fort Collins, CO (US)

(73) Assignee: WOLF ROBOTICS, LLC, Fort Collins, CO (US)

( * ) Notice: Subject to any disclaimer, the term of this patent is extended or adjusted under 35 U.S.C. 154(b) by 400 days.

(21) Appl. No.: 13/621,757

(22) Filed: Sep. 17, 2012

(65) Prior Publication Data

US 2013/0247359 A1   Sep. 26, 2013

Related U.S. Application Data

(60) Provisional application No. 61/535,402, filed on Sep. 16, 2011.

(51) Int. Cl.
| | |
|---|---|
| B25B 5/00 | (2006.01) |
| B23Q 3/06 | (2006.01) |
| B23K 37/04 | (2006.01) |
| B23K 37/047 | (2006.01) |
| B25B 5/08 | (2006.01) |
| B25B 31/00 | (2006.01) |

(52) U.S. Cl.
CPC ............... *B25B 5/00* (2013.01); *B23K 37/047* (2013.01); *B23K 37/0408* (2013.01); *B23K 37/0452* (2013.01); *B23Q 3/06* (2013.01); *B25B 5/087* (2013.01); *B25B 31/005* (2013.01); *Y10T 29/49998* (2015.01)

(58) Field of Classification Search
CPC ........ B25B 5/003; B25B 5/04; B25B 31/005; B23Q 3/06; B23Q 3/067; B23Q 2/152
USPC ..................................... 269/48, 48.1, 55, 900
See application file for complete search history.

(56) References Cited

U.S. PATENT DOCUMENTS

| | | | |
|---|---|---|---|
| 4,097,069 A | 6/1978 | Morrill | |
| 4,682,766 A * | 7/1987 | Barkley | ........................ 269/71 |
| 4,990,022 A | 2/1991 | Watanabe | |

(Continued)

OTHER PUBLICATIONS

International Search Report in corresponding PCT application, Serial No. PCT/US2012/055806, mailed Jun. 20, 2013.

*Primary Examiner* — Lee D Wilson
(74) *Attorney, Agent, or Firm* — William W. Cochran; Cochran Freund & Young LLC

(57) ABSTRACT

Disclosed is a rotary actuated axial clamp that includes a primary fixture, having a rotatable primary clamp, having primary clamp fingers that engage secondary clamp fingers on a stationary secondary clamp. The primary fixture is attached to a positioner, while the secondary fixture is attached to the work piece. Different secondary fixtures can be utilized to fit the shape and size of the work piece, while maintaining a secondary clamp that is able to engage the primary clamp of the primary fixture. The primary fixture can consequently be utilized with numerous different work pieces having different shapes and sizes by simply modifying a secondary fixture to adapt to the size and shape of the work piece. Roller engagement of the primary clamp and secondary clamp reduces the force required to clamp and unclamp the primary and secondary fixtures. This reduces problems associated with attaching a work piece to a positioner.

6 Claims, 14 Drawing Sheets

(56) References Cited

U.S. PATENT DOCUMENTS

| | | | |
|---|---|---|---|
| 5,433,490 A | 7/1995 | Hurd | |
| 5,607,251 A | 3/1997 | Rafn | |
| 5,845,898 A * | 12/1998 | Halder et al. | 269/48.1 |
| 6,302,617 B1 | 10/2001 | Rumpp | |
| 8,671,533 B2 * | 3/2014 | Haag et al. | 29/235 |
| 2008/0203636 A1 * | 8/2008 | Schenck et al. | 269/25 |
| 2010/0067983 A1 | 3/2010 | Simmons | |
| 2013/0247359 A1 * | 9/2013 | Schoening | 29/559 |

\* cited by examiner

ROTARY ACTUATED AXIAL CLAMP

CROSS-REFERENCE TO RELATED APPLICATION

This application is based upon and claims priority to U.S. provisional application Ser. No. 61/535,402, filed Sep. 16, 2011, entitled "Rotary Actuated Axial Clamp," which application is specifically incorporated herein by reference for all that it discloses and teaches.

BACKGROUND

It is often beneficial to be able to move heavy objects, such as heavy machinery, for the purpose of orienting the machinery in a particular orientation to achieve a certain result. For example, it is beneficial during fabrication of large machinery to perform welding operations on large pieces, so that the pieces are disposed in a manner such that the welds are performed in a substantially horizontal orientation during the welding process. Large positioners are used to position work pieces to be welded to achieve the proper orientation. In addition, positioners can be used to move pieces for other purposes, such as assembly, repair, material working, painting, rust removal, disassembly, and numerous other functions.

SUMMARY

An embodiment of the present invention may therefore comprise a clamp for clamping a work piece to a positioner comprising: a primary fixture comprising: a primary fixture plate; a primary clamp that is rotatably attached to said primary fixture plate; a plurality of primary clamp fingers disposed between openings in said primary clamp; an actuator coupled to said primary clamp and said primary fixture plate that rotates said primary clamp between an open position and a closed position; a slew ring that is adapted to be attached to said positioner; a secondary fixture comprising: a secondary clamp; a plurality of secondary clamp fingers disposed between openings in said secondary clamp that are engaged by said primary clamp fingers when said secondary fixture is attached to said primary fixture and said actuator rotates said primary clamp to said closed position.

An embodiment of the present invention may further comprise a method of clamping a work piece to a positioner comprising: attaching a primary fixture to said positioner so that said primary fixture can be rotated on said positioner around a primary clamp; rotating said primary clamp on said primary fixture so that primary clamp fingers on said primary clamp are disposed in an open position; attaching a secondary fixture to said work piece; assembling said secondary fixture with said primary fixture so that secondary clamp fingers of a secondary clamp are aligned with openings between said primary clamp fingers; rotating said primary clamp to a closed position so that said primary clamp fingers are aligned with said secondary clamp fingers and said primary fixture is clamped to said secondary fixture.

DETAILED DESCRIPTION OF THE EMBODIMENTS

Figure 1:
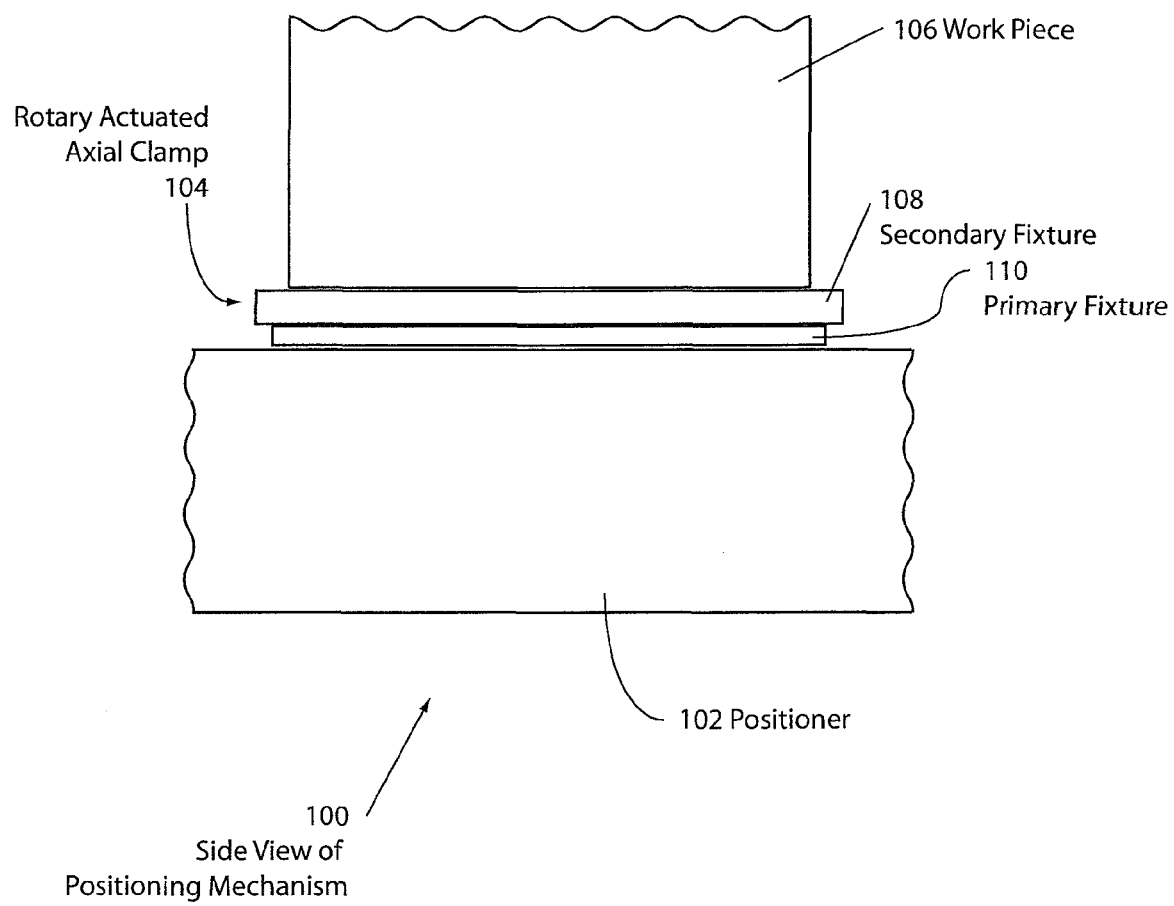
FIG. 1 is a side view of a work piece, a rotary actuated axial clamp and a positioner.

FIG. 1 is a side view of a positioning mechanism 100 that includes a positioner 102, a rotary actuated axial clamp 104 and a work piece 106. Work piece 106 comprises a piece that can be positioned by the positioner 102 so that a weld is performed in a horizontal position. Positioner 102 may comprise various types of positioners, such as sky hook positioners, drop center positioners, head and tail stock positioners, etc. Positioner 102 can also be used to move the piece 106 for other purposes, such as set forth above. Work piece 106 may vary in size and weight. For example, work piece 106 may vary from just a few thousand pounds up to over 200,000 pounds. In that regard, the rotary actuated axial clamp 104 can be easily scaled to handle both large and small objects.

The rotary actuated axial clamp 104, illustrated in FIG. 1, is used to attach the work piece 106 to the positioner 102. The rotary actuated axial clamp 104 comprises a secondary fixture 108 that is connected to the work piece 106 and a primary fixture 110 that is connected to the positioner 102. The secondary fixture 108 is normally bolted to the piece 106, while the primary piece 110 is either bolted or otherwise attached to the positioner 102 to provide a solid mount of the primary piece 110 to the positioner 102. For example, primary fixture 110 may be welded to the positioner 102.

Since the weight of the work piece 106, illustrated in FIG. 1, can exceed 200,000 pounds, very robust ways of attaching the work piece 106 to the positioner 102 must be used. Prior art devices have used pin and block techniques for fastening these large objects. One of the problems associated with the pin and block technique is that the pin may tend to bind and a very large amount of force may be required to extract the pin. This occurs especially when the work piece is welded and heated to high temperatures. One unique feature of the embodiments disclosed herein is that rolling contacts are utilized to clamp the work piece, which significantly reduces the friction required to clamp and unclamp the work piece to and from the positioner. In fact, the clamping and unclamping forces can be reduced by an order of magnitude using the various embodiments of a rolling clamp that are disclosed herein, as opposed to pin and block techniques.

Referring again to FIG. 1, positioner 102 may be rated to carry work pieces, such as work piece 106, having certain weights. For example, in one embodiment, positioner 102 may be rated to carry work pieces that range in weight from 0 to 5,000 pounds. Other positioners may be rated from 5,000 to 20,000 pounds. Some positioners may be rated from 20,000 to 100,000 pounds. Other positioners may be rated to handle work pieces from 100,000 to 220,000 pounds. As such, the rotary actuated axial clamp 104 may be built to handle loads that meet or exceed the maximum ratings of positioner 102. In that manner, the primary fixture 110 can be fixed, either semi-permanently or permanently, to the positioner 102 and have a rating that meets or exceeds the weight range ratings of the positioner 102. The secondary fixture 108, of course, can vary in size and shape based upon the work piece 106 to which the secondary fixture 108 is attached. For example, the secondary fixture 108 may have a shape that allows convenient attachment of the work piece 106 to the secondary fixture 108. Of course, the clamping mechanisms in the secondary fixture 108 remain consistent so that the secondary fixture 108 mates with the primary fixture 110 to form a rotary clamp. Further, the primary fixture 110 is designed to include the moving mechanism and the more expensive parts associated with the rotary actuated axial clamp 104, while secondary fixture 108 comprises a static device that is less expensive. Since the secondary fixtures 108 can be designed and changed for the particular work piece 106, less expense is involved in creating a rotary actuated axial clamp 104 that will fit different sizes and shapes of the work piece 106.

Figure 2:
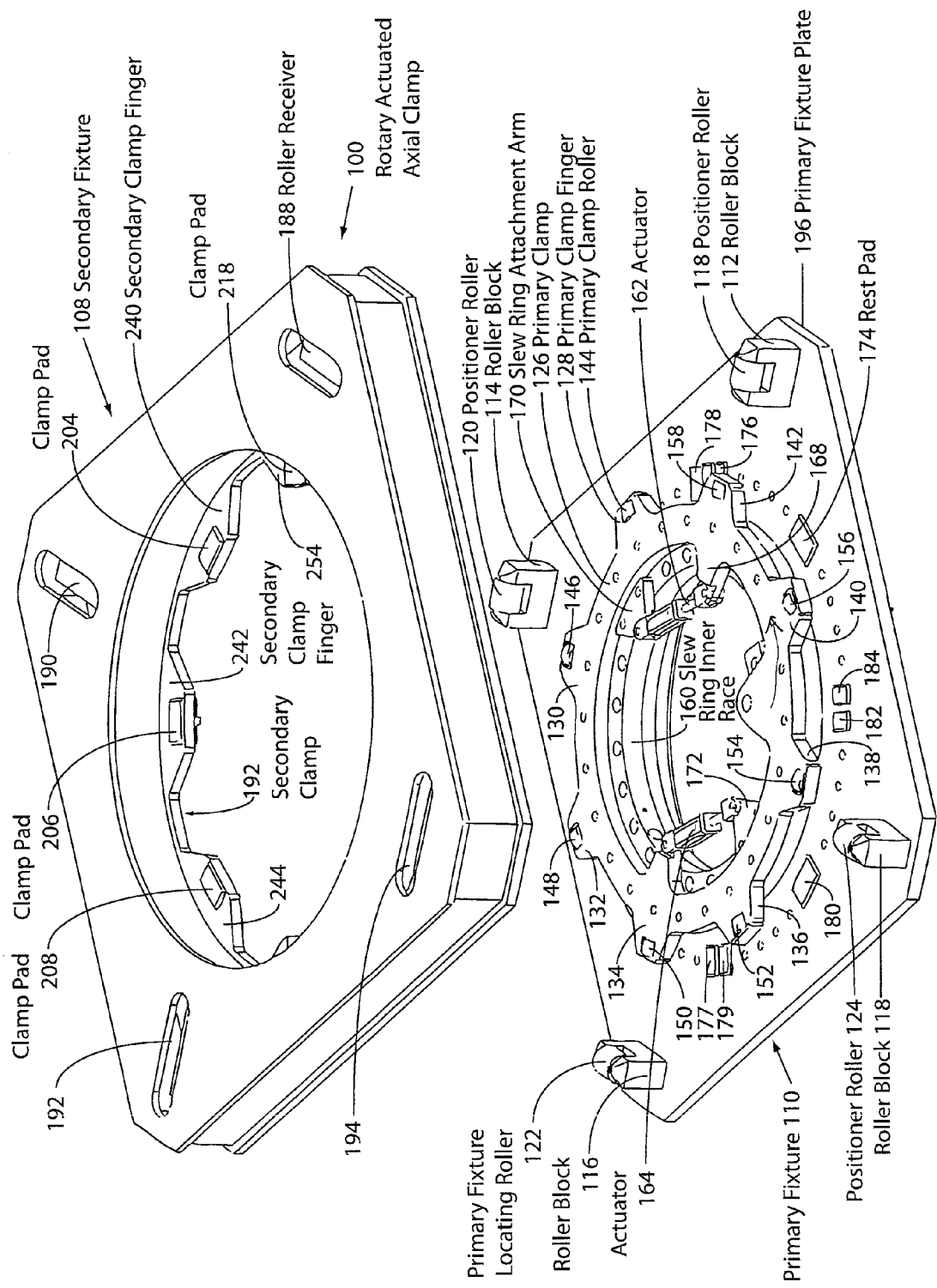
FIG. 2 is a perspective view of an embodiment of a rotary actuated axial clamp that is disassembled showing a primary fixture and a secondary fixture.

FIG. 2 is an isometric exploded diagram of the rotary actuated axial clamp 100. As shown in FIG. 2, the secondary fixture 108 is aligned with the primary fixture 110. Roller receivers 188, 190, 192, 194 are aligned to engage the positioner rollers 118, 120, 122, 124 that are mounted on roller blocks 112, 114, 116, 118, respectively. Because of the orientation of the roller receivers 188, 190, 192, 194, the secondary fixture 108 can only be mounted on the primary fixture 110 in one orientation. The position rollers 118, 120, 122, 124 are rotatably connected to roller blocks 112, 114, 116, 118, respectively. The positioner rollers 118-124 engage roller receivers 188, 190, 192, 194, respectively. The roller receivers 188-194, in conjunction with the positioner rollers 118-124, provide a gross alignment of the secondary fixture 108 with the primary fixture 110. Centering rest pads 177, 179, 182, 184, 176, 178, as well as other centering rest pads (not shown), provide a finer alignment when engaged by a torque key, such as torque key 260 (FIG. 9), which is mounted on the lower surface of the secondary clamp fingers, such as secondary clamp fingers 240, 242, 244, 246, 248, 250, 252, 254.

As also illustrated in FIG. 2, primary clamp 126 of the primary fixture 110 is rotatably mounted on the primary fixture 110. Primary clamp 126 has a number of primary clamp fingers 128, 130, 132, 134, 136, 138, 140, 142. The number of primary clamp fingers is dependent upon the size and weight of the work piece 106. For very large and heavy work pieces, numerous primary clamp fingers may be utilized. For lighter work pieces, as few as three primary clamp fingers may be utilized. While the smaller rotary clamps may have a diameter of approximately 20 inches, the larger diameter clamps may have a diameter of up to 100 inches or more. Each of the primary clamp fingers 128-142 includes a primary clamp roller 144, 146, 148, 150, 152, 154, 16, 158, respectively. The primary clamp rollers 144-158 provide a rolling engagement between the primary clamp 126 and the secondary clamp 192. Secondary clamp 192 has a plurality of secondary clamp fingers 240, 242, 244, 246, 248, 250, 252, 254 (FIG. 7) that are engaged by primary clamp fingers 128-142. Each of the fingers helps distribute the load around the primary clamp 126 and the secondary clamp 192. Primary clamp rollers 144-158 engage the clamp pads 204, 206, 208, 210, 212, 214, 216, 218 when the actuators 162, 164 are actuated to rotate the primary clamp 126 in a counterclockwise direction. The clamp pads 204-218 are made from a hardened material. In addition, the primary clamp rollers 144-158 are also made from a hardened material, which reduces wear and lowers the resistance during clamping and unclamping of the primary clamp 126. The hardened materials also prevent binding during the clamping and unclamping process, since the hardened materials are not compressed, or compressed very little, as a result of the weight of the work piece 106.

As also illustrated in FIG. 2, the primary clamp 126 is coupled to actuators 162, 164. Actuators 162, 164 are also connected to the primary clamp slew ring inner race 160, which remains stationary with respect to the primary fixture plate 196. Actuation of actuators 162, 164 causes the primary clamp 126 to rotate in a counterclockwise direction, as viewed in FIG. 2. Actuators 162, 164 can be actuated with a hydraulic actuator or a pneumatic actuator. Since the primary clamp 126 is in rolling contact with the secondary clamp 192, pneumatic actuation of the actuators 162, 164 can be accomplished even on the large rotary actuated axial clamps 100 that carry work pieces that weigh over 200,000 pounds. Actuator 162 is coupled to the slew ring inner race 160 by way of slew ring attachment arm 170. Similarly, actuator 164 is connected to the slew ring inner race 160 by slew ring attachment arm 172.

Figure 3:
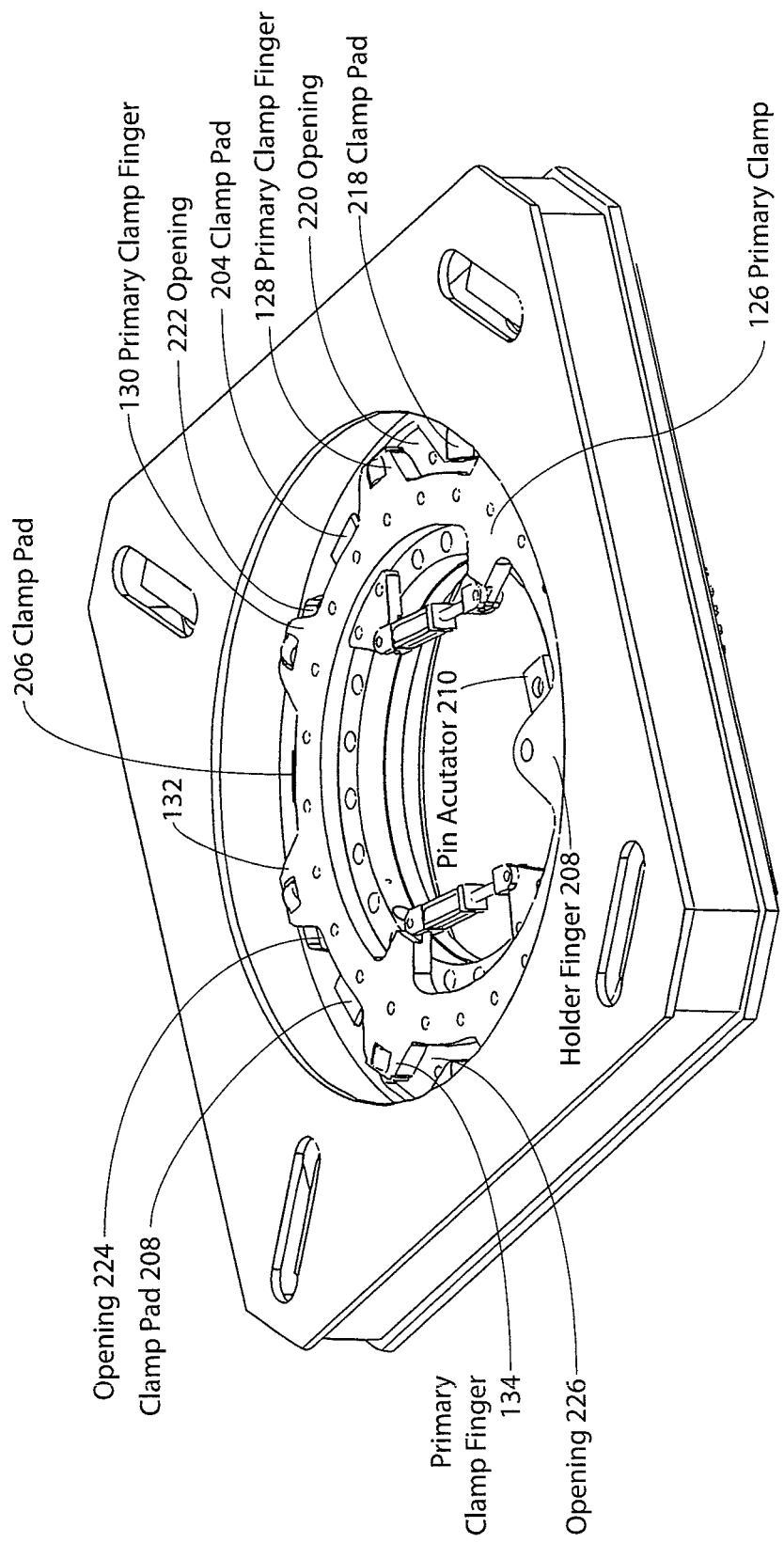
FIG. 3 is an isometric view of a primary fixture and a secondary fixture of the embodiment of FIG. 2 that are assembled in an unclamped position.
Figure 7:
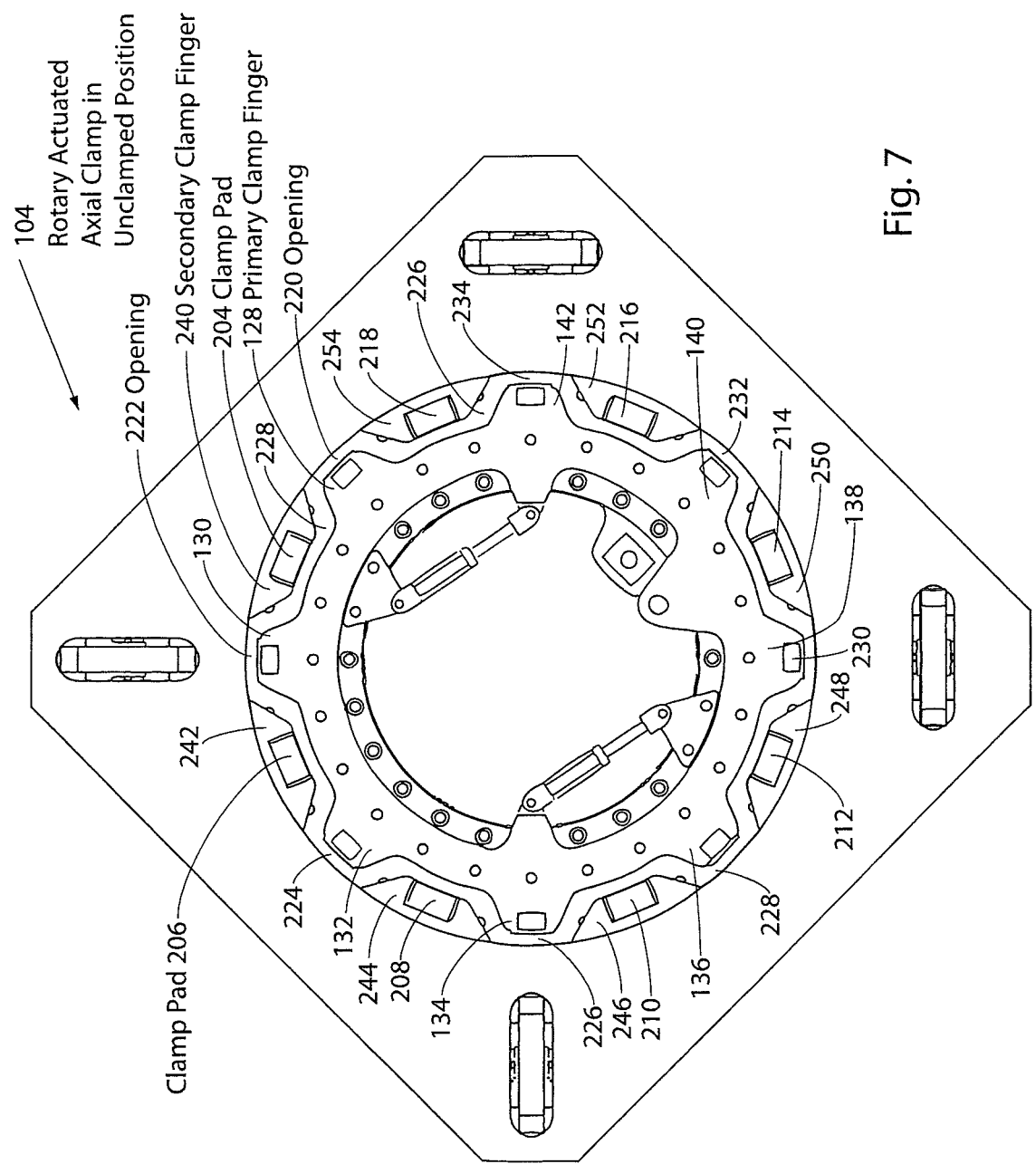
FIG. 7 is a top view of the rotary actuated axial clamp of the embodiment of FIG. 2 in an unlocked position.

FIG. 3 is a schematic isometric view of the secondary fixture 108 assembled with the primary fixture 110 in an unclamped position. As illustrated in FIG. 3, primary, clamp fingers 128, 130, 132 and 134 pass through openings 220, 222, 224, 226, respectively. When actuated, the primary clamp fingers 128, 130, 132, 134 rotate in a counterclockwise direction and engage clamp pads 218, 204, 206, 208 (FIG. 7). Holder finger 208 is rotated to align with pin actuator 210. Pin actuator 210 drives a pin through the holder finger 208 and holds the primary clamp 126 in the clamped position, as more fully illustrated in FIG. 4.

Figure 4:
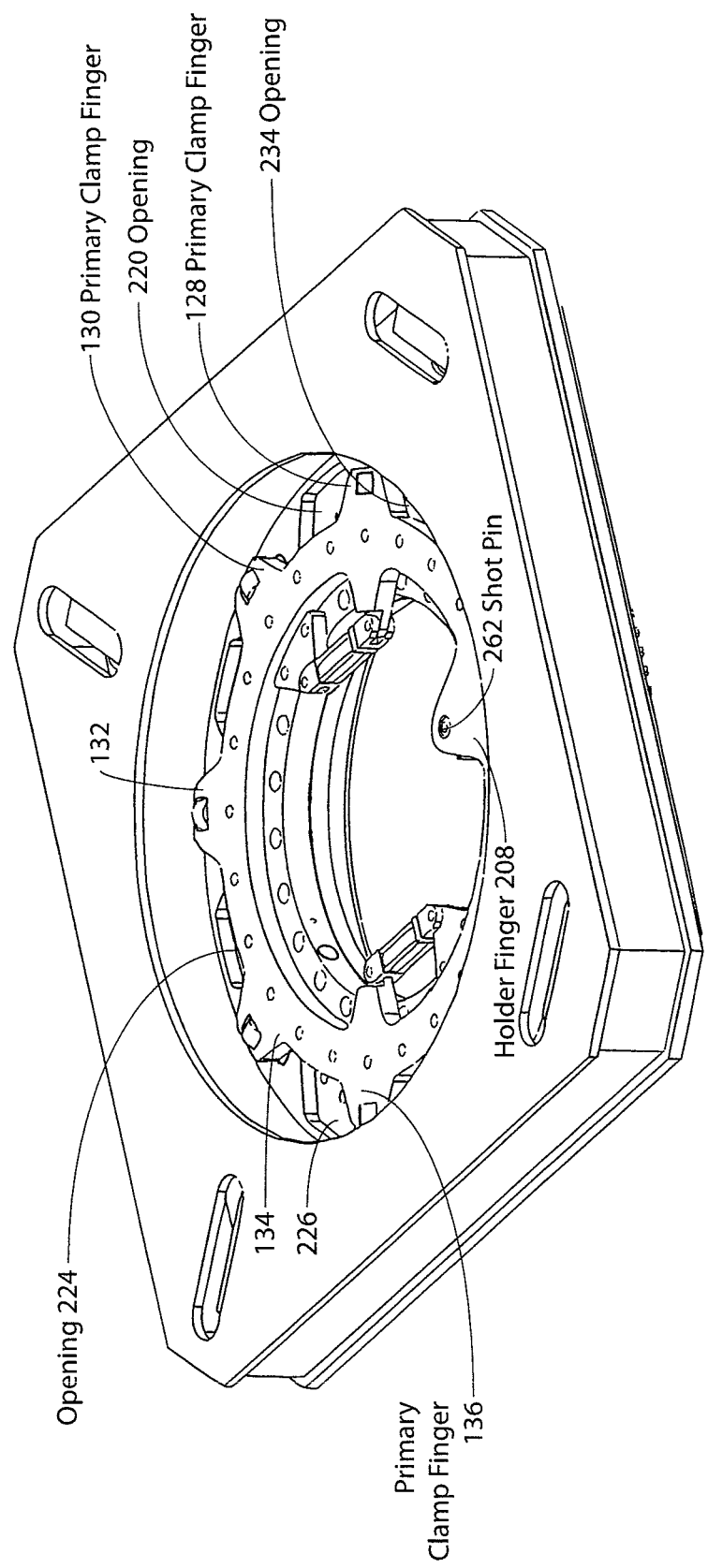
FIG. 4 is an isometric view of the primary fixture and the secondary fixture of the embodiment of FIG. 2 in a clamped position.

FIG. 4 is a schematic isometric view of the secondary fixture 108 and the primary fixture 110 assembled in the clamped position. As illustrated in FIG. 4, the primary clamp fingers 128, 130, 132, 136 are rotated away from the openings 220, 222, 224, 226. Holder finger 208 is rotated so that shot pin is inserted in the opening in the holder finger 208 to secure the primary clamp 126.

Figure 5:
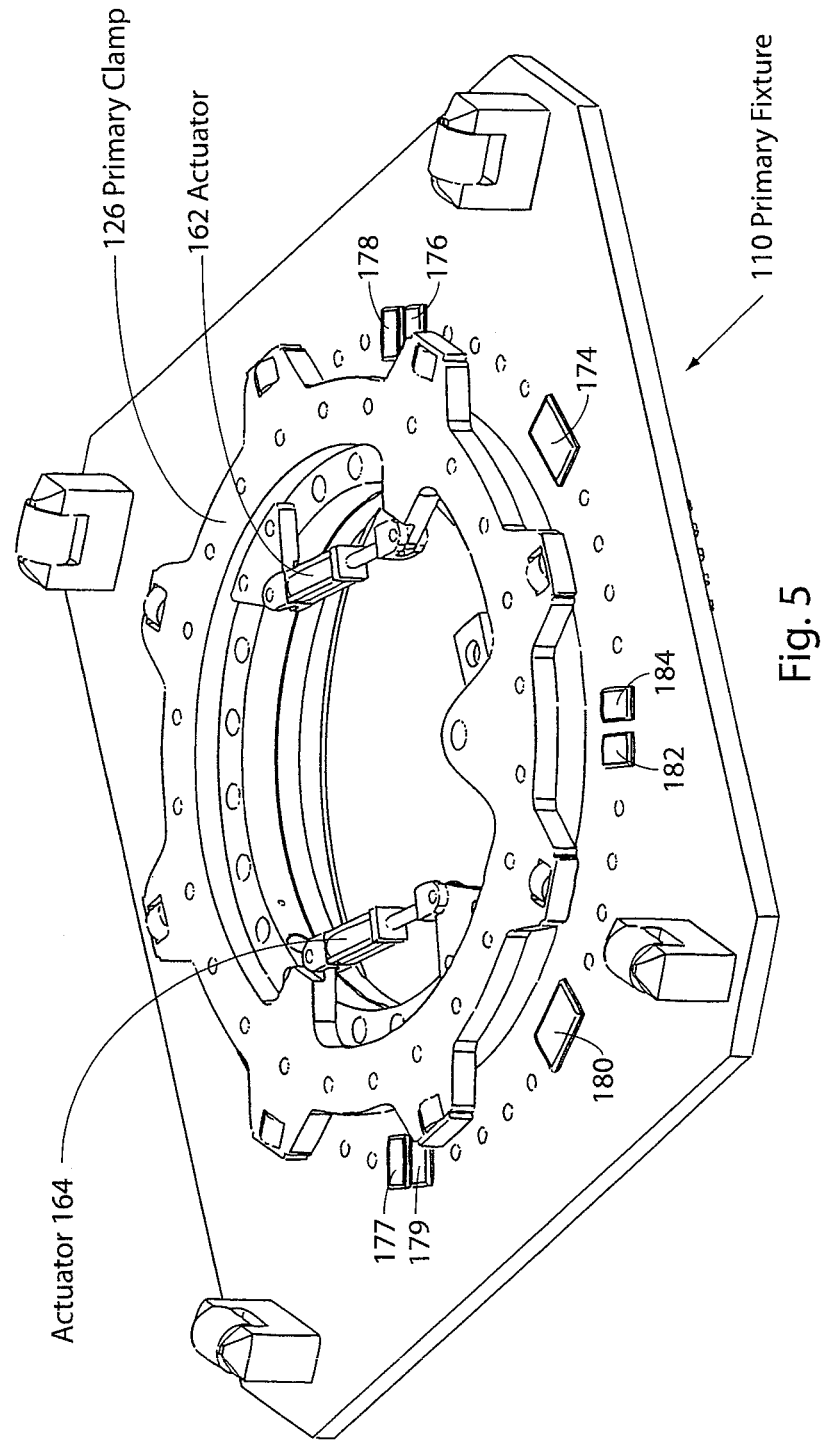
FIG. 5 is an isometric view of the primary fixture of the embodiment of FIG. 2 in an open position.

FIG. 5 is a schematic perspective view of the primary fixture 110 in an open position. As illustrated in FIG. 5, actuators 162, 164 are extended so that the primary clamp 126 is in an open position. As such, the primary clamp fingers are aligned between the rest pads 177, 179, 180, 182, 184, 174, 176, 178.

Figure 6:
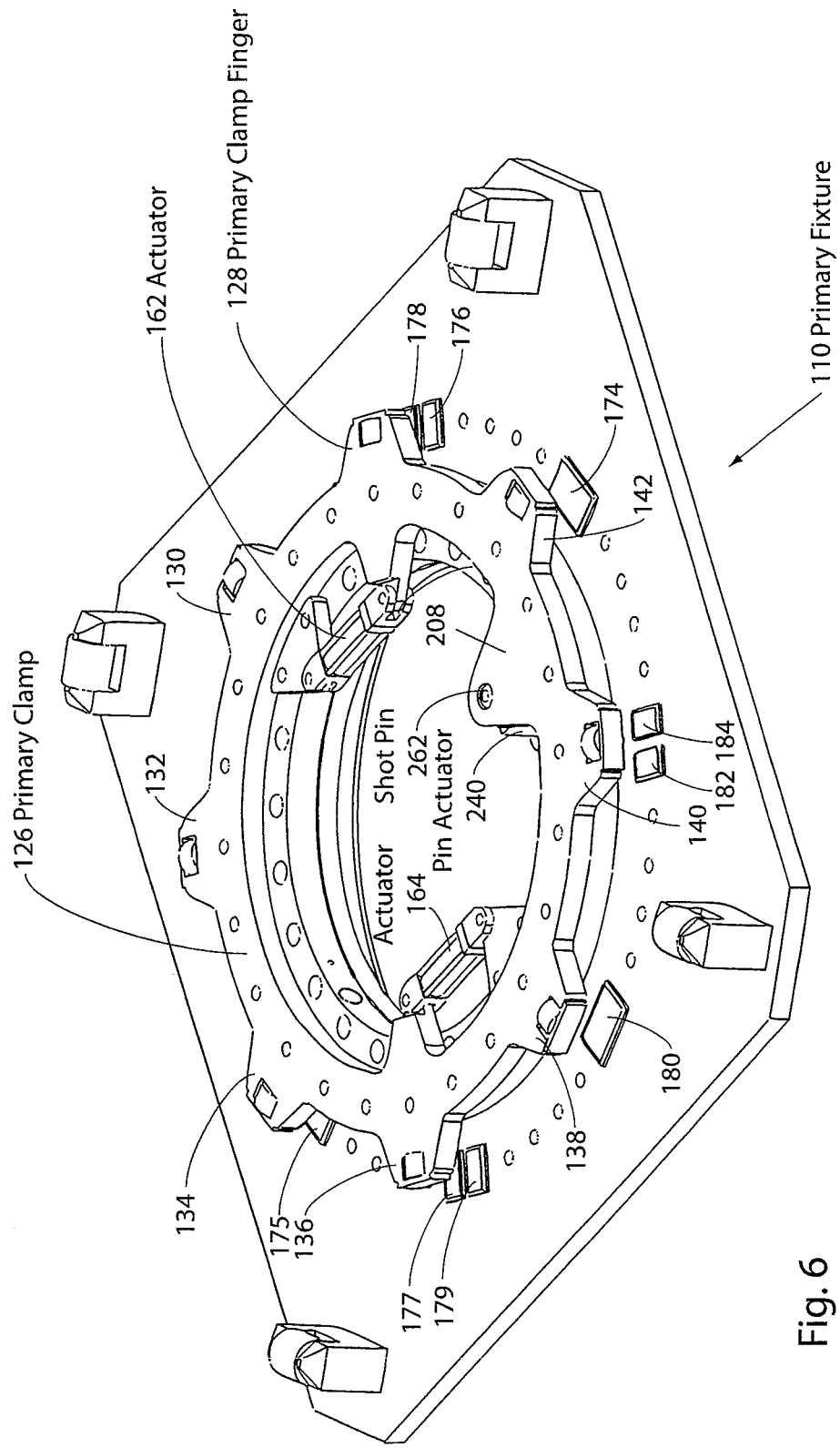
FIG. 6 is an isometric view of the primary fixture of the embodiment of FIG. 2 in a closed position.

FIG. 6 is a schematic isometric view of the primary fixture 110 in a closed position. As illustrated in FIG. 6, actuators 162, 164 are in a closed position, which rotates the primary clamp 126 in a counterclockwise direction. As such, the primary clamp fingers 128, 130, 132, 134, 136, 138, 140, 142 are rotated so that they are aligned with the various clamp pads, such as clamp pads 177, 179, 180, 182, 184, 174, 176, 178.

Pin actuator 240 causes the shot pin 262 to be inserted in an opening in finger holder 208 to prevent further movement of primary clamp 126.

FIG. 7 is a schematic top view of the secondary fixture 108 that is aligned with the primary fixture in an unclamped position. As illustrated in FIG. 7, primary clamp fingers 128, 130, 132, 134, 136, 138, 140, 142 fit in the openings 220, 222, 224, 226, 228, 230, 232, 234. Similar openings between the primary clamp fingers 128-142 allow the secondary clamp fingers 240, 242, 244, 246, 248, 250, 252, 254 to slide between the primary clamp fingers 128-142, so that the secondary clamp fits below the primary clamp. In this manner, the rollers on the primary clamp fingers 128-142 can be seated on top of the clamp pads 204, 206, 208, 210, 212, 214, 216, 218, respectively, when actuators 162, 164 are actuated, as illustrated in FIG. 8.

Figure 8:
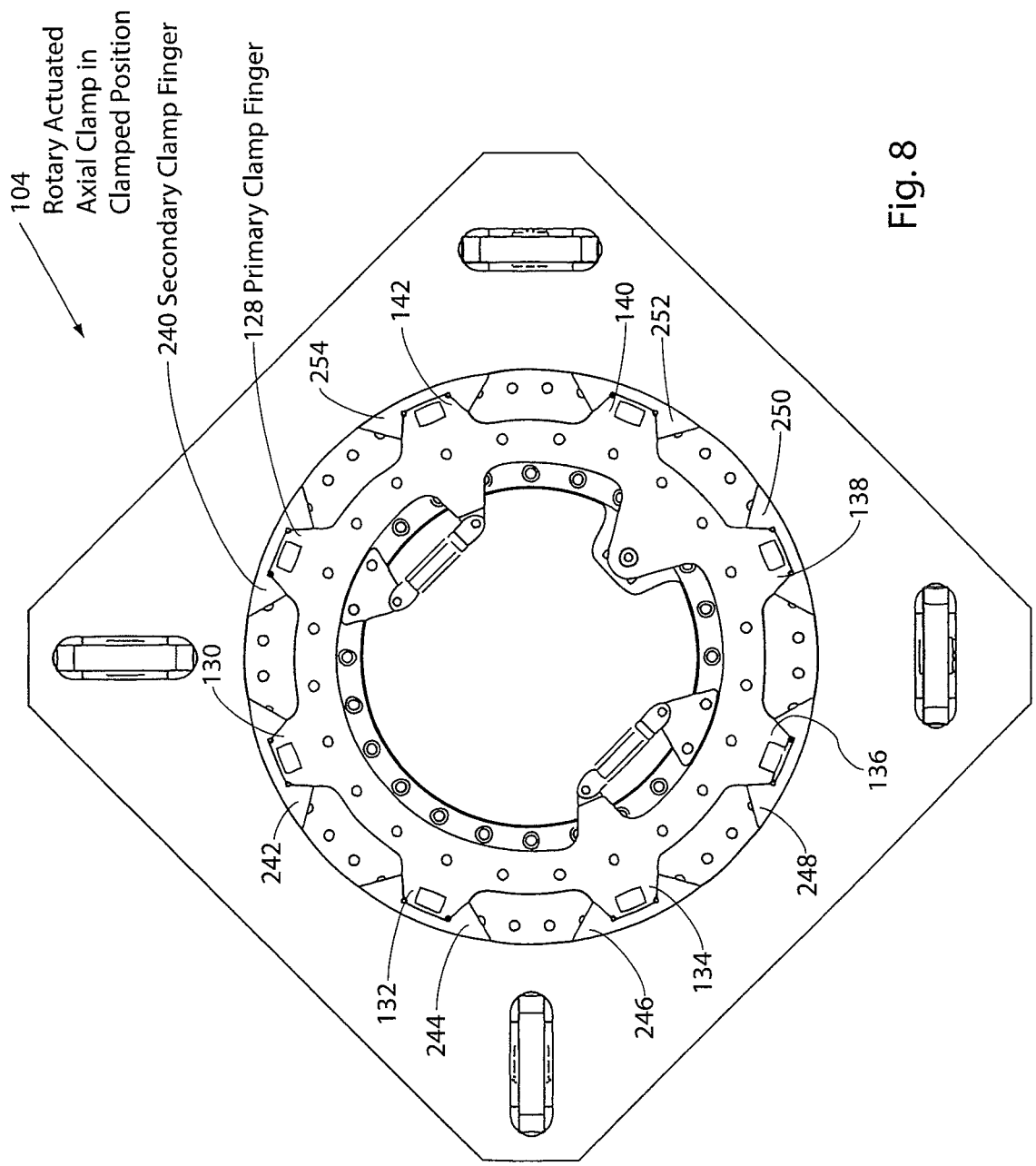
FIG. 8 is a top view of the rotary actuated axial clamp of the embodiment of FIG. 2 in a clamped position.

FIG. 8 is a schematic top view of the rotary actuated axial clamp 104 in a clamped position. As illustrated in FIG. 8, the primary clamp 126 has been rotated in a counterclockwise position by actuators 162, 164 that are shown in the closed position. As the primary clamp 126 is rotated in a counterclockwise direction, the primary clamp finger 128 engages the secondary clamp finger 240. Similarly, primary clamp fingers 130, 132, 134, 136, 138, 140, 142 engage secondary clamp fingers 242, 244, 246, 248, 250, 252, 254, respectively. Again, the number of primary clamp fingers and secondary clamp fingers can be increased or decreased depending upon the load. FIG. 8 also illustrates the clamping slew ring inner race 160 that is attached to the primary fixture plate 196. The clamping ring inner race 160 may be bolted or attached by any desired means to the primary fixture plate 196, including welding.

Figure 9:
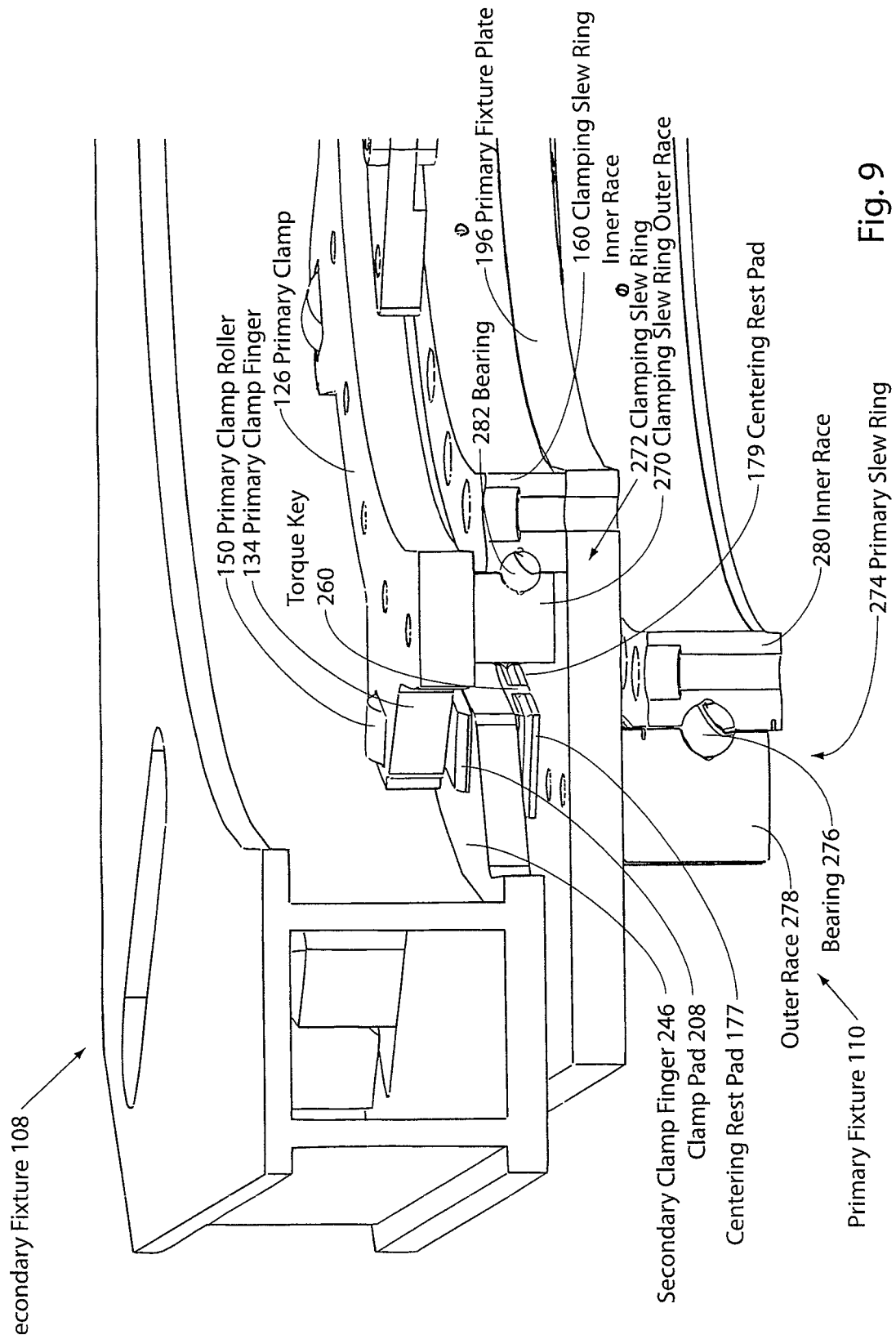
FIG. 9 is a cutaway view of the embodiment of FIG. 2 illustrating portions of the primary fixture and secondary fixture.

FIG. 9 is a cutaway view of a portion of the secondary fixture 108 that is assembled with the primary fixture 110 in a clamped position. As shown in FIG. 9, primary clamp finger 134 is aligned with and engages a secondary clamp finger 246. Clamp pad 208 provides a surface for the primary clamp roller 150 when the secondary fixture 108 is clamped to the primary fixture 110. Again, the clamp pad 208 and the primary clamp roller 150 are made from hardened metals that will not depress under the weight of the work piece 106. Clamp pad 208 can be designed to fill any gap that exists between the secondary clamp finger 246 and the primary clamp finger 134. Removal of any space or gap between the secondary clamp finger and the primary clamp finger 140 prevents the secondary fixture 108 from moving with respect to the primary fixture 110. The clamping slew ring 272 comprises a clamping slew ring outer race 270 and a clamping slew ring inner race 160. Primary clamp 126 is attached to the clamping slew ring outer race 270 by any desirable means, including bolting of the primary clamp 126 to the clamping slew ring outer race 270. Bearing 128 allows the clamping slew ring outer race 270 to rotate around the clamping slew ring inner race 160. Clamping slew ring inner race 160 is attached to the primary fixture plate 196 by any desirable means, including bolting of the clamping slew ring inner race 160 to the primary fixture plate 196.

As also illustrated in FIG. 9, the secondary clamp finger 246 includes a torque key 260, which is an extended ridge that extends downwardly from the secondary clamp finger 246. Centering rest pads 177, 179 have a slot formed between the centering rest pads 177, 179 that is adapted to receive the torque key 260. The torque key 260, in conjunction with centering rest pads 177, 179, functions as a fine adjustment for placing the secondary fixture 108 on the primary fixture plate 196 of the primary fixture 110. The positioner rollers 118-124, as well as the roller blocks 112, 118, engage the roller receivers 188, as set forth in FIG. 2, to provide a rough locating guide for guiding the secondary fixture 108 on the primary fixture 110. The torque key 260, in conjunction with the centering rest pads 177, 179, provide the fine adjustment that is desirable for locating the secondary fixture 108 with respect to the primary fixture 110.

As further illustrated in FIG. 9, the primary slew ring 274 comprises an outer race 278 and an inner race 280. The primary fixture plate 196 is attached to the outer race 278 in any desirable fashion, including bolting, welding, etc. Outer race 278 rotatably engages the inner race 280 of the primary slew ring 274 with a bearing 276. In this mariner, the outer race 278 can rotate around the inner race 280. Inner race 280 is bolted, or attached in any desirable fashion, to the positioner 102. Outer race 278 can include gear slots that allow the primary fixture 110 and the mounted secondary fixture 108 to rotate with respect to the inner race 180 and the positioner 102. As is apparent from FIG. 9, the forces generated between the primary clamp finger 134 and the secondary clamp finger 246 are aligned with the outer race 278 of the primary slew ring 274. In that regard, these forces are directly transferred between the work piece 106 and the positioner 102 through solid portions of the rotary actuated axial clamp 104, so that the rotary actuated axial clamp 104 can handle large weights and engage and disengage the primary clamp.

Figure 10:
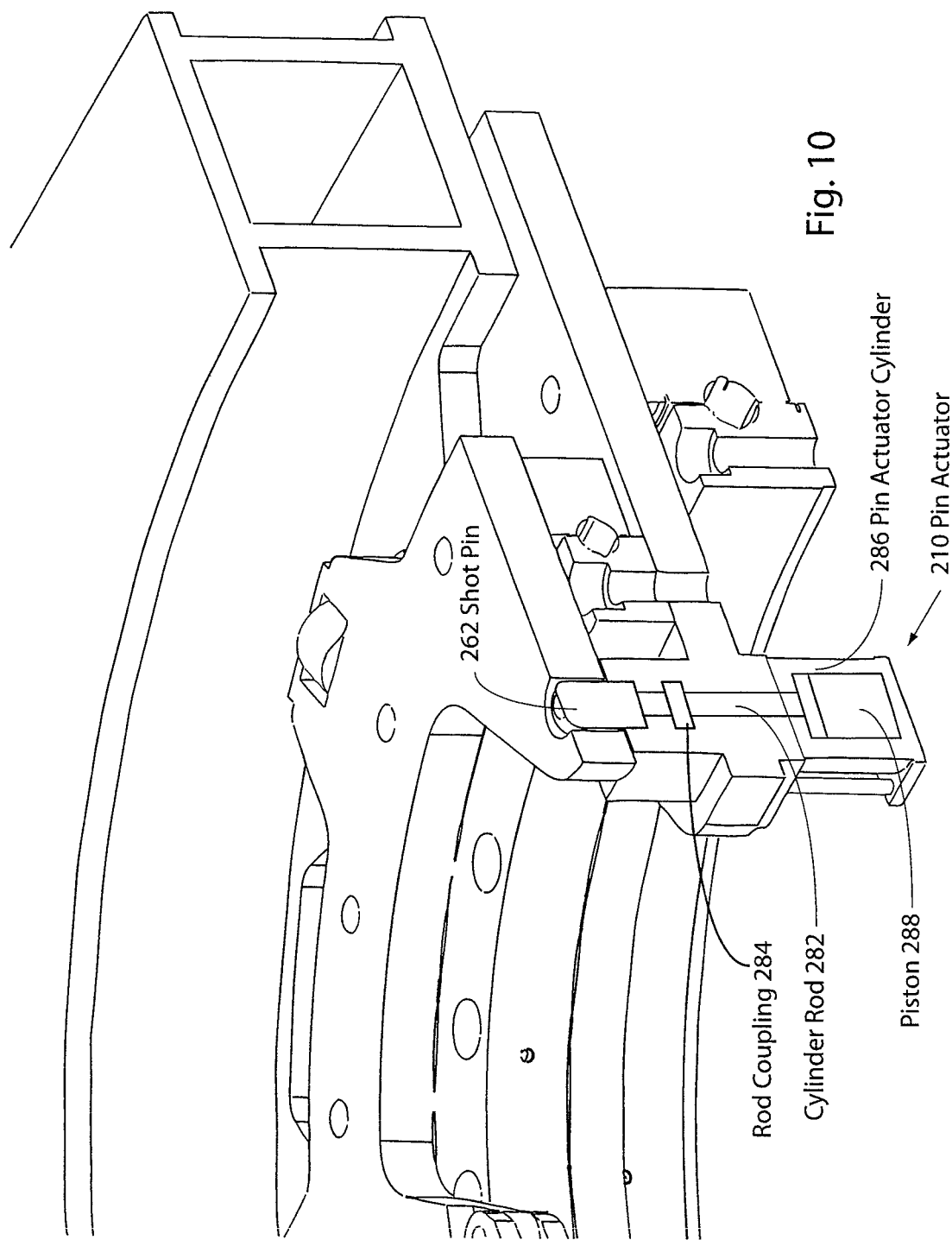
FIG. 10 is a cutaway view of the rotary actuated axial clamp of the embodiment of FIG. 2 illustrating portions of the primary fixture and the secondary fixture.

FIG. 10 is a partial cutaway view of the pin actuator 210. As illustrated in FIG. 10, shot pin 262 is coupled to a rod coupling 284, which couples the shot pin 262 to the cylinder rod 282. A piston 288 is disposed in a pin actuator cylinder 286, which actuates the rod cylinder 282, the rod coupling 284 and the shot pin 262. Piston 288 can be driven either pneumatically or hydraulically, as desired. Since pneumatic systems are somewhat cheaper than hydraulic systems, all of the systems illustrated with respect to the embodiments of the rotary actuated axial clamp 104 can be driven using pneumatic systems, which reduces the cost of the overall system, so that a single pneumatic system can be used, rather than necessitating the inclusion of an additional hydraulic system.

Hence, the rotary actuated axial clamp 104 provides a device for attaching a work piece 106 to a positioner 102 using a roller engagement that has low frictional properties. The low frictional properties allow rotary actuated axial clamp 104 to engage and disengage the primary piece 110 from the secondary piece 108 with forces generated by a pneumatic actuator. Hydraulic actuators can also be utilized. The rotary actuated axial clamp 104 can be scaled to handle small and large loads while maintaining the low frictional process of engaging and disengaging the primary fixture 110 from the secondary fixture 108. In addition, inexpensive secondary pieces can be made for particular parts, which are able to engage a standard primary piece 110 that is attached to the positioner 102. In this manner, different types of connectors do not need to be fabricated for different sizes and shapes of work pieces. Rather, only an inexpensive secondary fixture 108 can be fabricated to fit the different sizes and shapes of the work piece 106.

Figure 11:
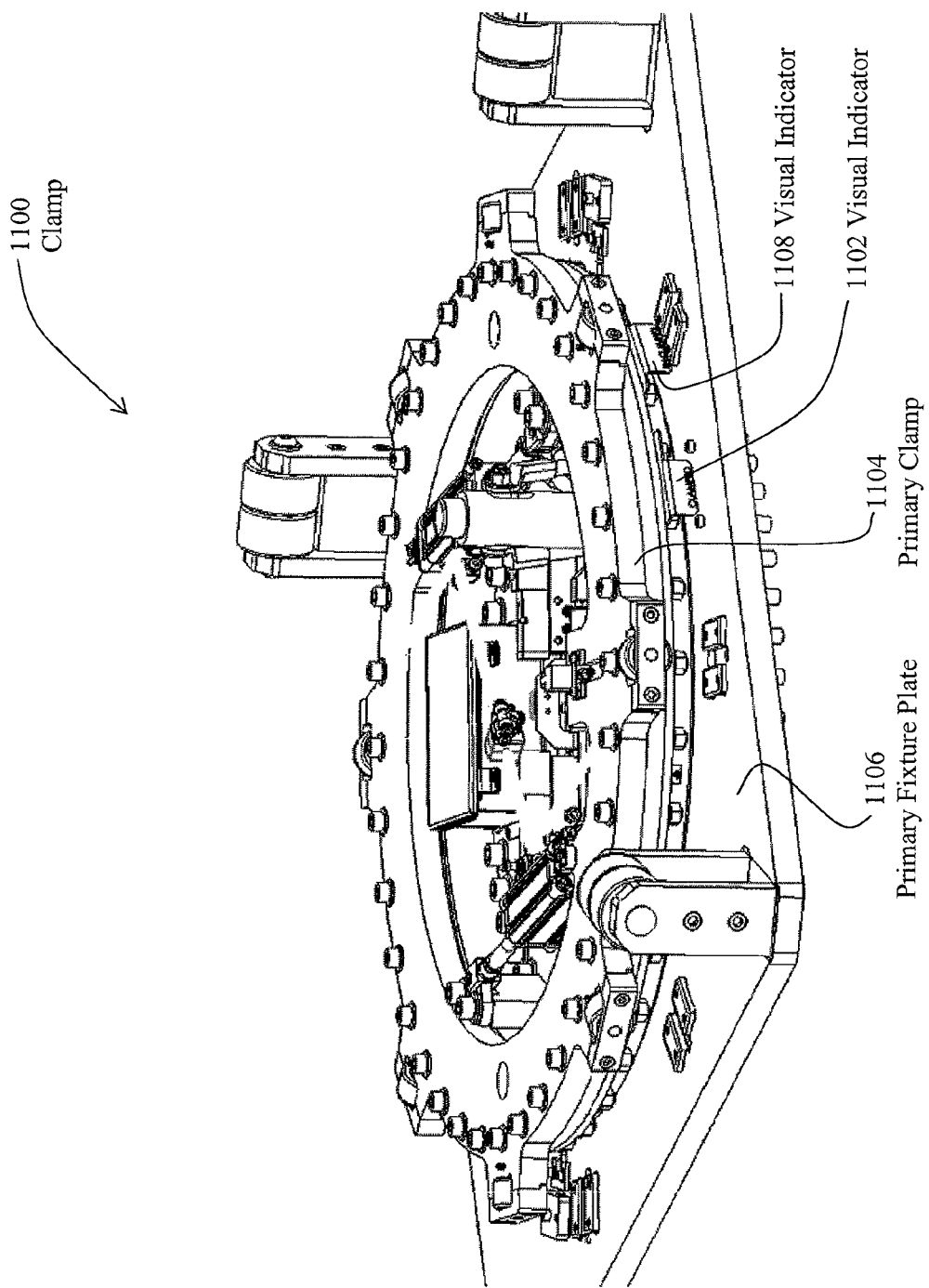
FIG. 11 is an isometric view of a clamp that includes a visual indicator indicating that the clamp is in the clamped position.

FIG. 11 is an isometric view of a clamp 1100 that includes a visual indicator 1102 indicating that clamp 1100 is in the clamped position. The visual indicator 1102 is attached to the rotating primary clamp 1104 and moves to the visible position illustrated in FIG. 11 when the clamp 1100 is in the clamped position. The visual indicator 1102 is visible through an opening between the work piece and the primary fixture plate 1106 of the clamp 1100. As illustrated in FIG. 11, the visual indicator 1108 is not visible when the clamp is in the clamped position.

Figure 12:
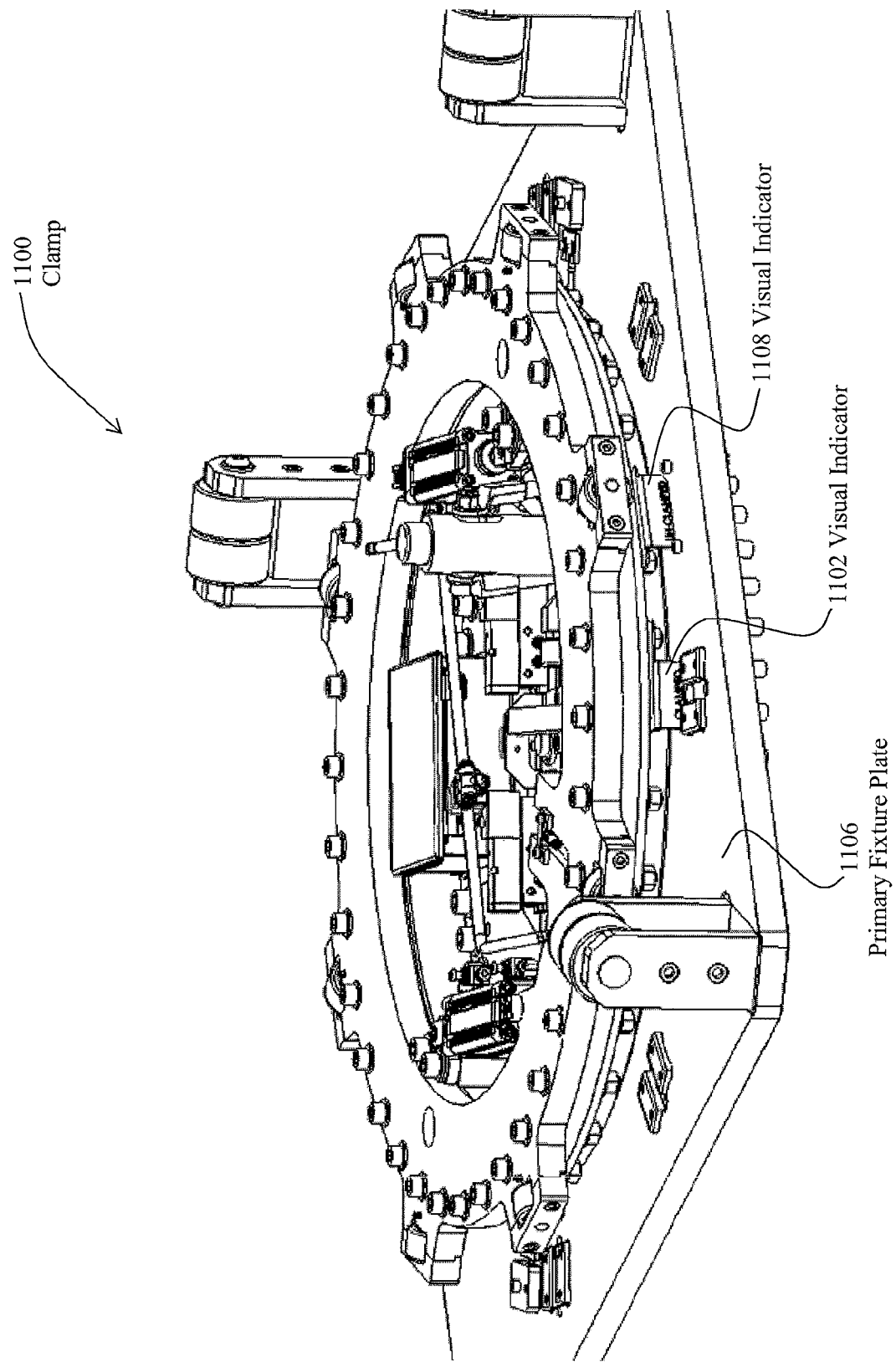
FIG. 12 is an isometric view of a clamp that includes a visual indicator indicating that the clamp is in the unclamped position.

FIG. 12 is an isometric view of the clamp 1100, illustrated in FIG. 11. Clamp 1100 is in the unclamped position, as indicated by visual indicator 1108. Visual indicator 1108 is connected to the primary clamp 1104, which places the visual indicator 1108 just above the primary fixture plate 1106, where it can be viewed. Visual indicator 1108 indicates that the clamp 1100 is in an unclamped position. Visual indicator 1102 is rotated to the position illustrated in FIG. 12, where it is not visible to a user. In this manner, visual indicators 1102, 1108 provide a clear view of the position of the clamp in either a clamped or unclamped position that corresponds to the position of the primary clamp 1104. Although electronic devices may be present on the clamp to indicate the status of the clamp in either a clamped or unclamped position, visual indicators 1102, 1108 provide a visual indication that is mechanically coupled to the rotating ring to prevent any misreading of the orientation of the clamp 1100.

Figure 13:
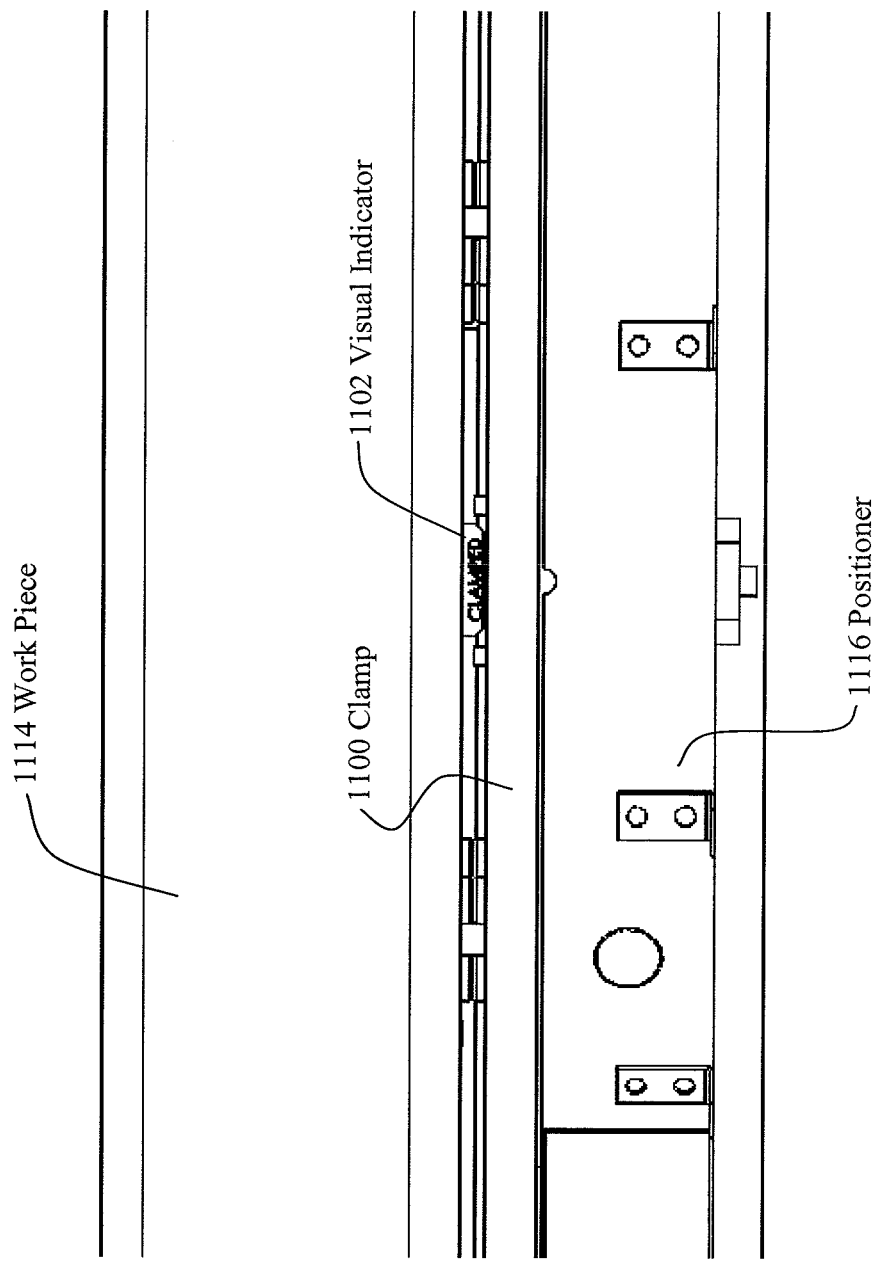
FIG. 13 is a side view of the clamp disposed between the work piece and the positioner.

FIG. 13 is a side view of the clamp 1100, which is disposed between the work piece 1114 and the positioner 1116. As illustrated in FIG. 13, there is a gap in the clamp, so that the visual indicator 1102 can indicate to a user that the clamp 1100 is in the clamped position.

Figure 14:
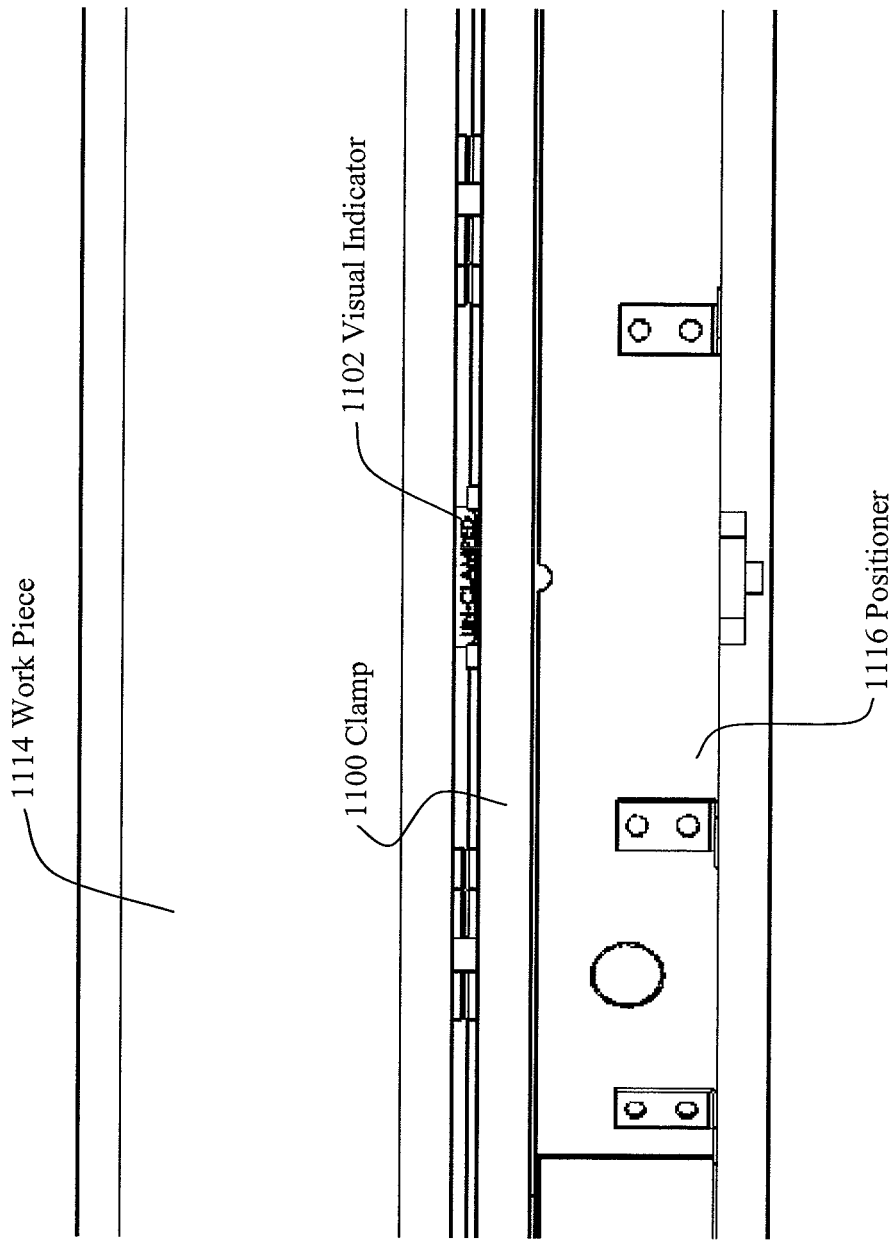
FIG. 14 is another side view of a clamp disposed between the work piece and the positioner.

FIG. 14 is another side view of the clamp 1100 disposed between the work piece 1114 and the positioner 1116. As illustrated in FIG. 14, the visual indicator 1108 indicates that the clamp 1100 is in the unclamped position. Visual indicator 1102 is not visible when the clamp 1100 is in the unclamped position. Accordingly, visual indicator 1108 provides a visual verification of the status of the clamp 1100 as being unclamped.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A clamp for clamping a work piece to a positioner comprising:
    a primary fixture comprising:
        a primary fixture plate;
        a primary clamp that is rotatably attached to said primary fixture plate;
        a plurality of primary clamp fingers disposed between openings in said primary clamp;
        an actuator coupled to said primary clamp and said primary fixture plate that rotates said primary clamp between an open position and a closed position;
    a secondary fixture comprising:
        a secondary clamp;
        a plurality of secondary clamp fingers disposed between openings in said secondary clamp that are engaged by said primary clamp fingers when said secondary fixture is attached to said primary fixture and said actuator rotates said primary clamp to said closed position.

2. The clamp of claim 1 wherein said actuator is a pneumatically actuated actuator.

3. The clamp of claim 1 further comprising:
    alignment fixtures disposed on said primary fixture and said secondary fixture that prevent said secondary fixture from being assembled on said primary fixture in an incorrect orientation.

4. The clamp of claim 1 further comprising:
    rollers disposed on said primary clamp fingers that assist in rotatably engaging said primary clamp with said secondary clamp.

5. The clamp of claim 1 further comprising:
    a shot pin that prevents said primary clamp from rotating when said shot pin is engaged with said primary clamp.

6. The clamp of claim 1 further comprising:
    clamp pads disposed on said secondary clamp that reduce space between said primary clamp and said secondary clamp.

* * * * *